(12) United States Patent
Ryan et al.

(10) Patent No.: US 6,973,539 B2
(45) Date of Patent: Dec. 6, 2005

(54) MULTIPROCESSOR WRITE-INTO-CACHE SYSTEM INCORPORATING EFFICIENT ACCESS TO A PLURALITY OF GATEWORDS

(75) Inventors: Charles P. Ryan, Phoenix, AZ (US); Wayne R. Buzby, Phoenix, AZ (US)

(73) Assignee: Bull HN Information Systems Inc., Billerica, MA (US)

( * ) Notice: Subject to any disclaimer, the term of this patent is extended or adjusted under 35 U.S.C. 154(b) by 411 days.

(21) Appl. No.: 10/426,409

(22) Filed: Apr. 30, 2003

(65) Prior Publication Data

US 2004/0221107 A1    Nov. 4, 2004

(51) Int. Cl.$^7$ ............................................. G06F 12/00
(52) U.S. Cl. ................... 711/130; 711/119; 711/121; 711/152
(58) Field of Search ...................... 711/121, 130, 152

(56) References Cited

U.S. PATENT DOCUMENTS

| | | | |
|---|---|---|---|
| 6,314,499 B1 * | 11/2001 | Kermani | 711/147 |
| 6,401,176 B1 * | 6/2002 | Fadavi-Ardekani et al. | 711/151 |
| 6,551,084 B2 * | 4/2003 | Sundstrom | 418/203 |
| 6,587,926 B2 * | 7/2003 | Arimilli et al. | 711/122 |

* cited by examiner

Primary Examiner—T Nguyen
(74) Attorney, Agent, or Firm—James H. Phillips

(57) ABSTRACT

A multiprocessor write-into-cache data processing system includes a feature for preventing hogging of ownership of a first gateword stored in the memory which governs access to a first common code/data set shared by processes running in the processors by imposing first delays on all other processors in the system while, at the same time, mitigating any adverse effect on performance of processors attempting to access a gateword other than the first gateword. This is achieved by starting a second delay in any processor which is seeking ownership of a gateword other than the first gateword and truncating the first delay in all such processors by subtracting the elapsed time indicated by the second delay from the elapsed time indicated by the first delay.

3 Claims, 12 Drawing Sheets

MULTIPROCESSOR WRITE-INTO-CACHE SYSTEM INCORPORATING EFFICIENT ACCESS TO A PLURALITY OF GATEWORDS

CROSS-REFERENCE TO RELATED APPLICATION

Reference may be taken to related co-pending U.S. patent application Ser. No. 10/403,703 entitled EQUAL ACCESS TO PREVENT GATEWORD DOMINANCE IN A MULTIPROCESSOR WRITE-INTO-CACHE ENVIRONMENT by Wayne R. Buzby et al, filed on Mar. 31, 2003, and assigned to the same Assignee.

FIELD OF THE INVENTION

This invention relates to the art of multiprocessing and, more particularly, to method and apparatus for controlling multiple gateword acquisition in a multiprocessor write-into-cache environment. More specifically yet, this invention relates not only to preventing a "hogging" condition in which a given processor is unable to timely acquire a gateword which is controlling access to a process or data set, but also to efficient access to a plurality of gatewords. Still more specifically, this invention most particularly relates to significantly improving system efficiency when a plurality of gatewords are being competed for among the system processors.

BACKGROUND OF THE INVENTION

An operating system for a multiprocessor environment can have several processes that are common code elements used by all processors. Similarly, several processes may share common data sets used by all processors. In a multiprocessor system having a "write-into-cache" architecture, gatewords are used in a software controlled process to prevent more than one processor from executing common code or accessing shared data at the same time. A unique gateword that is assigned to a given process or data set is tested to assure that no other processor is currently executing or accessing the information a given processor is requesting. This procedure is necessary to prevent a detrimental activity from occurring when a processor changes data at the same time another processor is using it.

In a write-into-cache architecture, the gateword (stored in a main memory before startup or before a climb to another job) for given code or data has typically been transferred from one processor to another while testing for the gateword to be OPENed (made available). This requires data siphoning between private caches associated with each processor. The siphoning process introduces significant delays when the copied data must be siphoned through multiple levels of cache; e.g., across two private caches and two shared caches. Thus, in modern multiprocessing systems, not all processors have been equal when it comes to data siphoning delays. The more cache mechanisms a given gateword must pass through, the longer it will take the gateword to arrive at the requesting processor.

A process decision cannot be made until a siphoned gateword arrives and can be tested by a processor seeking access to the code/data guarded by the gateword. The delays can be sufficiently excessive as to prevent a processor with long siphon delays in a given condition from timely acquiring the relevant gateword before another processor has overwritten (and thus "Closed") it. This undesirable result is commonly called "hogging".

Different schemes to work around the hogging problem use software delays before the gateword is retested, but these delays are made without any assurance that a processor board (carrying a plurality of CPUs) that currently retains the gateword will relinquish access to a CPU on another, "gateword-starved", board. Other schemes use interrupts to broadcast the identity of the processor board that currently has control of the gateword so that CPUs on the same board will detect this and then delay longer, giving CPUs on another board (gateword starved board) a chance to access the gateword. Still other mechanisms use a dedicated processor to maintain a gateword queue, while yet other systems devote hardware in the form of FIFO arrays or fast logic across board boundaries in attempts to create equal access to gatewords in a multiprocessor environment.

Software systems have typically relied on hardware to mediate the gateword access controls using a read-alter-rewrite method of access. Specific gate handling instructions used this mechanism which was satisfactory when processors in a multiprocessor system had substantially the same access times within the context of processor clock speeds. But, as hardware designs became more complex and processor speeds increased, it also became more difficult to attain the interface speeds necessary to handle the gateword access priority without a system performance penalty. The responsibility for access to heavily used gatewords has gradually become more dependent on software mechanisms as software designers are increasingly aware of the problems that can occur as a result of the hogging effect.

Most software techniques employed to handle the hogging problem are of fixed delay types that will always delay access to a gateword whether a delay is required or not. Fixed delay techniques significantly reduce system performance, and this type of software technique must be tuned to the system architecture and may even have to be tuned to various gates within the operating system.

One highly effective solution for the hogging problem is disclosed and claimed in copending application Ser. No. 10/219,644, filed Aug. 15, 2002, entitled: "Gateword Acquisition in a Multiprocessor Write-Into-Cache Environment" and owned by the same assignee as the present application. The solution set forth in application Ser. No. 10/219,644, however, requires the creation of at least one, and typically two, new operating system instructions. This requirement has certain potential drawbacks. Programmers must be informed about and understand the use of the new commands. Legacy software must be revised to include the command(s) in order to enjoy the anti-hogging benefits. There may not be sufficient unused operation codes in the instruction set, or even in the hardware, to accommodate the new instructions.

A different highly effective solution for the hogging problem is disclosed and claimed in copending application Ser. No. 10/256,289 filed Sep. 26, 2002, entitled: "Balanced Access to Prevent Gateword Dominance in a Multiprocessor Write-Into-Cache Environment" and owned by the same assignee as the present application. In the solution set forth in application Ser. No. 10/256,289, each processor includes a gate control flag. A gateword CLOSE command, establishes ownership of the gateword in one processor and prevents other processors from accessing the code/data guarded until the one processor has completed its use. A gateword OPEN command then broadcasts a gateword interrupt to set the flag in each processor, delays long enough to ensure that the flags have all been set, writes an OPEN value into the gateword and flushes the gateword to main memory.

A gateword access command executed by a requesting processor checks its gate control flag, and if set, starts a fixed time delay after which normal execution continues. This solution to the hogging problem involves the addition of a flag in each processor and revision of OPEN and gateword access commands, and there may not be space in the hardware and/or instruction set to implement this solution.

Still another different and highly effective solution to the hogging problem is set forth in Related application Ser. No. 10/403,703 referred to above. In the solution disclosed in application Ser. No. 10/403,703, all processors read the gateword for testing from main memory rather than from the private cache of a processor which has gained control of the common code/data protected by the gateword. This process is carried out in a very efficient and reliable manner. Thus, all processors have equal access to the gateword because their hardware delays are all the same.

The invention disclosed and claimed in application Ser. No. 10/403,703 prevents or at least mitigates hogging for access to a single gate in contention, but multiple processes running in a multiprocessor system will typically require a number of gatewords, each guarding access to individual code/data sets. Thus, if a given processor wants access to a gateword that is not in contention with any other process, this processor's gate access will be forced to a full long delay in accordance with the invention disclosed and claimed in application Ser. No. 10/403,703, even though it does not want to compete for the same gateword.

This fact imposes limitations on system performance in systems employing multiple gatewords. Embodiments of the present invention significantly mitigate this problem as will become clear from the discussion below with reference to the several FIGs. Further, this end is achieved in a manner which can be readily adapted to all multiprocessor architectures. The present invention achieves these objectives in a relatively simple and highly effective manner.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DEFINITIONS

For a full understanding of the hogging problem and the embodiments of the invention, it is important to understand how certain "Siphori" and "Swap" information transfer operations have been performed in multiprocessor write-into-cache environments. As used in this description, a "word" is a fixed number of bits representing data as stored in the memory system. A "block" is a fixed number of words transported when accessing data in the memory system for efficiency of design and operation.

Figure 1:
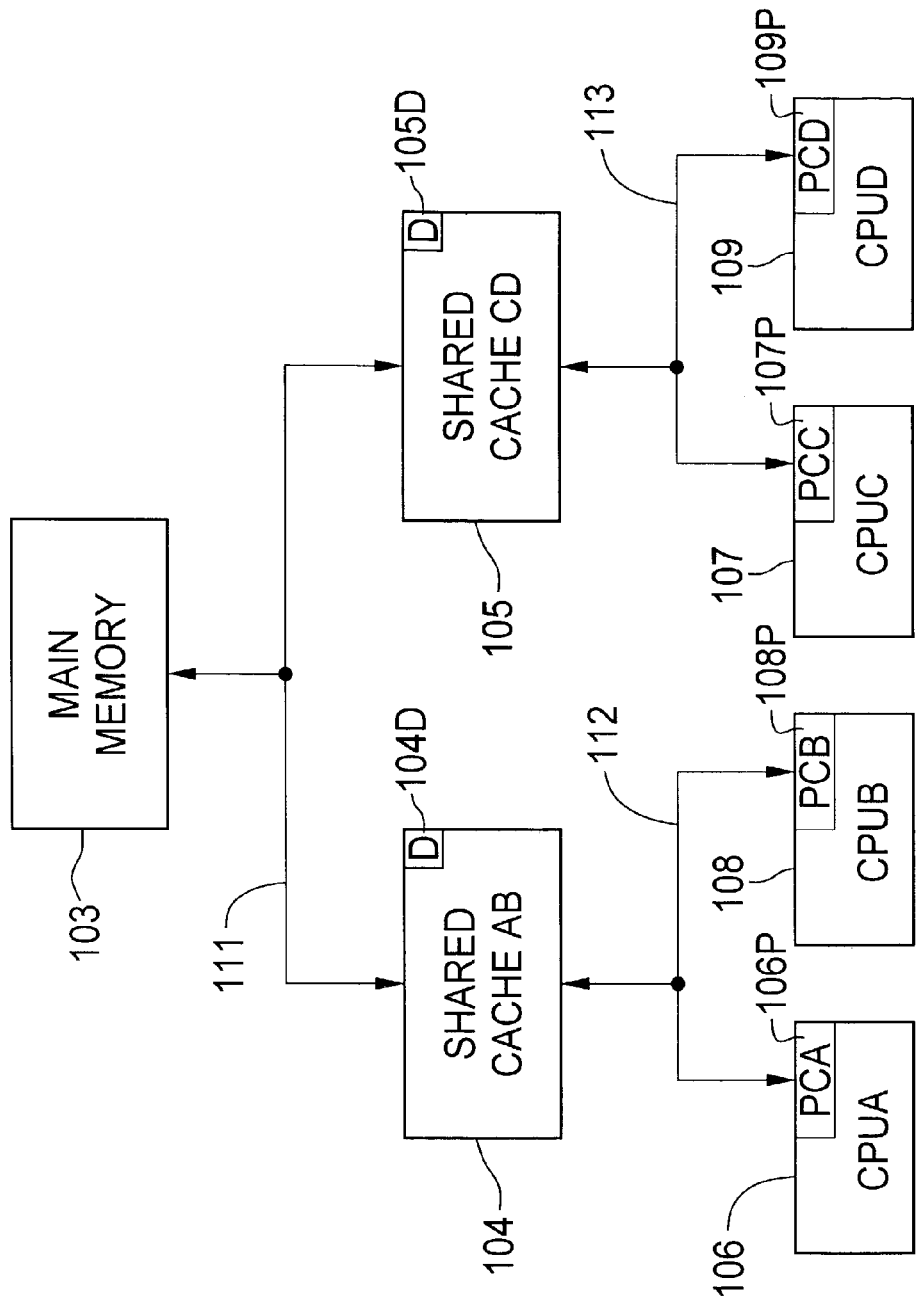
FIG. 1 is a block diagram of a simplified conventional multiprocessor system used to define the functions of certain widely-used "Siphori" and "Swap" (sometimes using other names) operations carried out as gateword information is transferred among processors and a main memory.

Referring to FIG. 1, a simplified conventional multiprocessor write-into-cache environment is shown. A plurality of processors, CPUA 106, CPUB 108, CPUC 107 and CPUD 109 in the example, each have a private cache, PCA 106P, PCB 108P, PCC 107P and PCD 109P, respectively. The Private Caches PCA, PCB of CPUA and CPUB, respectively, are coupled to one another and to a first Shared Cache 104 (Shared Cache AB) via a first local bus 112. Similarly, Private Caches PCC, PCD of CPUC and CPUD, respectively, are coupled to one another and to a second Shared Cache 105 (Shared Cache CD) via a second local bus 113. Shared Cache AB and Shared Cache CD each have an internal Directory, 104D, 105D, respectively, to track the contents and status of data stored therein. Shared Cache AB and Shared Cache CD communicate with one another and with a Main Memory 103 via a system bus 111. Conventionally, Shared Caches 104, 105 and Private Caches 106P, 108P, 107P, 109P are set associative; for example the Shared Caches may have four levels of association and the Private Caches sixteen levels of association. Consider now the following definitions in example:

CPU "Siphori", same Shared Cache: If CPUA has a "modified" (by CPUA after it has acquired "ownership") data block "X" within a given set, then none of other CPUs CPUB, CPUC, CPUD has a valid copy of that block in its Private Cache. Also, assume Shared Cache AB has an entry in its directory 104D that shows that CPUA owns block X. If CPUB now makes a read request for block X, then Shared Cache AB will send a "Siphori" request to CPUA for block X. CPUA will respond by sending a copy of block X to Shared Cache AB which will send block X to CPUB. The Private Cache PCA for CPUA will reset (in an internal directory in PCA, not shown) the "modified" indicator for block X to indicate that it no longer "owns" the only valid copy of block X. Also, the directory 104D for Shared Cache AB will be updated to show that CPUA no longer owns block X which means that PCA of CPUA now has only a read copy.

CPU "Siphori" different Shared Cache: If CPUA has a modified block "X", then none of the other CPUs have a valid copy of that block in their respective private caches. In addition, Shared Cache AB has an entry in its directory 104D that indicates that CPUA has the only valid copy of block X. If CPUC now makes a read request for block X, then Shared Cache CD must make a read request on the system bus 111 to all units on the bus including main memory 103. Shared Cache AB will check its directory 104D and determine that CPUA has the only valid copy of block X. In this case, the data will be siphoned from CPUA to Shared Cache AB and then sent across the system bus 111 to Shared Cache CD and then to PCC 107P, the Private Cache of CPUC. As the data is already on the system bus 111, it will also be written to Main Memory 103. (When a shared cache responds to a read request, then any parallel read response from the Main Memory is conventionally changed to a write-to-memory to update Main Memory with the siphoned copy.)

When a CPU request for a data block causes a siphon operation and that CPU request is for a write action, then the requesting CPU requires ownership of the block and, ultimately, will have the only valid copy when it modifies the block. In that case, the siphon action is also a clear action such that a "Siphon and Clear" command is applied to all copies of the requested block in the system. When the requesting CPU overwrites the siphoned block, it will mark the block "modified", and the directory of it's Shared Cache will indicate the requesting CPU's ownership of the block.

CPU "Swap" to Shared Cache: If CPUA has a modified data block X, within a set, where all the levels have a valid entry, should CPUA have a miss for a subsequent request to obtain data block Y whose address maps against this set, then a siphon request is made for the missing block Y. When the missing block y arrives, no space is available in the set since all entries are valid. By conventional means (not shown), space is made available for the new block Y by removing the "least recently used" (LRU) block from the set. If the LRU block is marked modified, it being the only valid copy in the memory system, it must be preserved and thus will be written ("swapped") from private cache to shared cache. In the example, block X data is sent from CPUA to Shared Cache AB, and Shared Cache AB's directory entry is updated to show that the block X data has been replaced with the new block. Block X no longer exists in PCA. However, Shared Cache AB will retain the block X, marking it valid with no CPU ownership, until Shared Cache AB needs to swap the block to Main Memory to make space within its own set.

Shared Cache "Swap" to Main Memory: Assume that CPUA has a modified block X and that the directory entry for block X in Shared Cache AB has all of its levels valid. If CPUB now makes a read or write request for a different block Y and there is a miss in both PCB and Shared Cache AB in the same set as block X, Shared Cache AB must broadcast a siphon request on the system bus to obtain block Y which may come from Shared Cache CD or Main Memory. If the replacement conditions (LRU) for Shared Cache AB directs block Y to the location of block X, then block X must be swapped to Main Memory. First, Shared Cache AB will siphon (and clear) the modified block X from CPUA and then swap/push the data for block X back to Main Memory. This makes room in Shared Cache AB for the data requested by CPUB for block Y.

DESCRIPTION OF THE PREFERRED EMBODIMENT(S)

Figure 2:
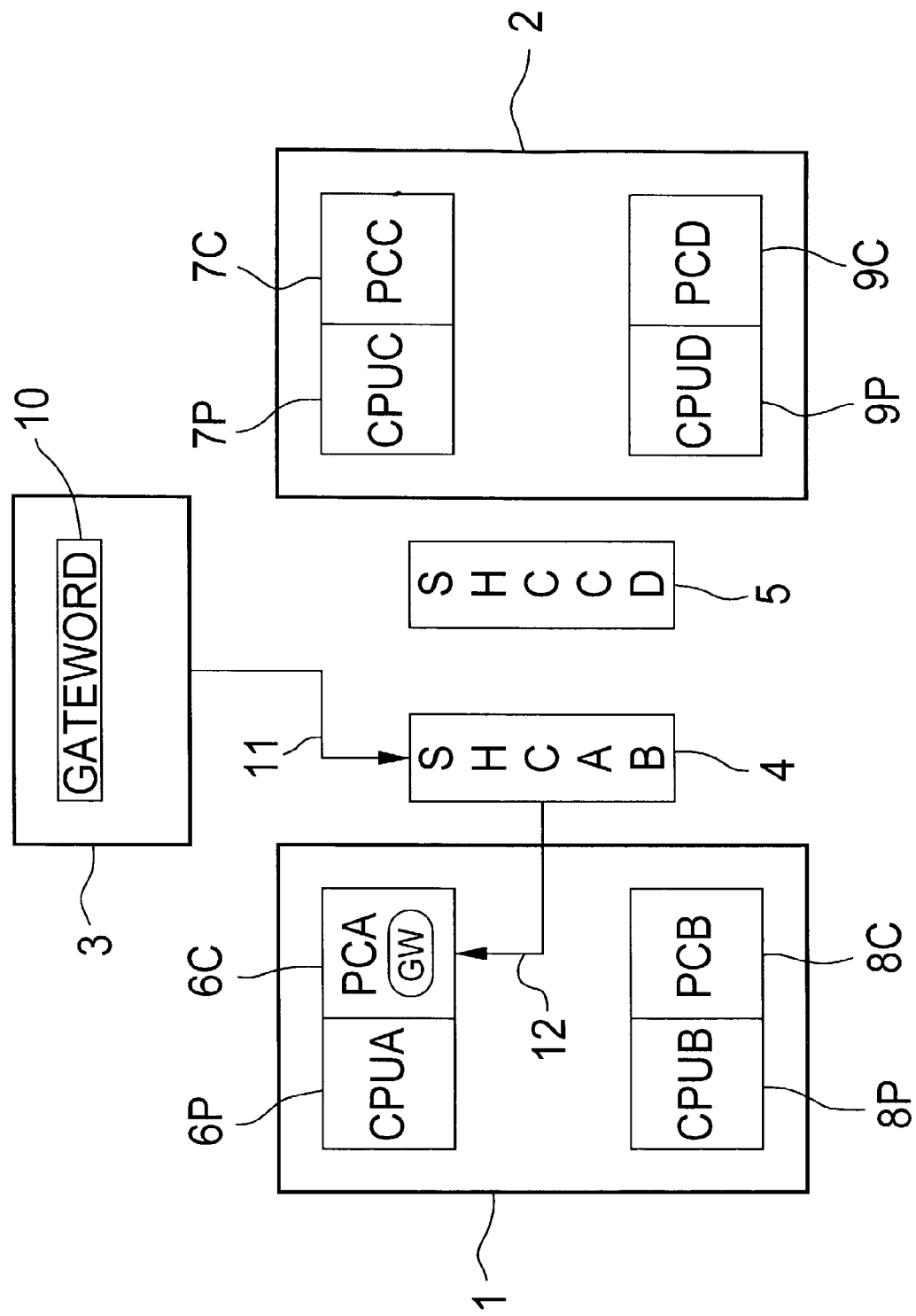
FIG. 2 is a block diagram of a simplified exemplary multiprocessor system showing a first condition in which a first processor obtains ownership of a gateword stored in a main memory.
Figure 3:
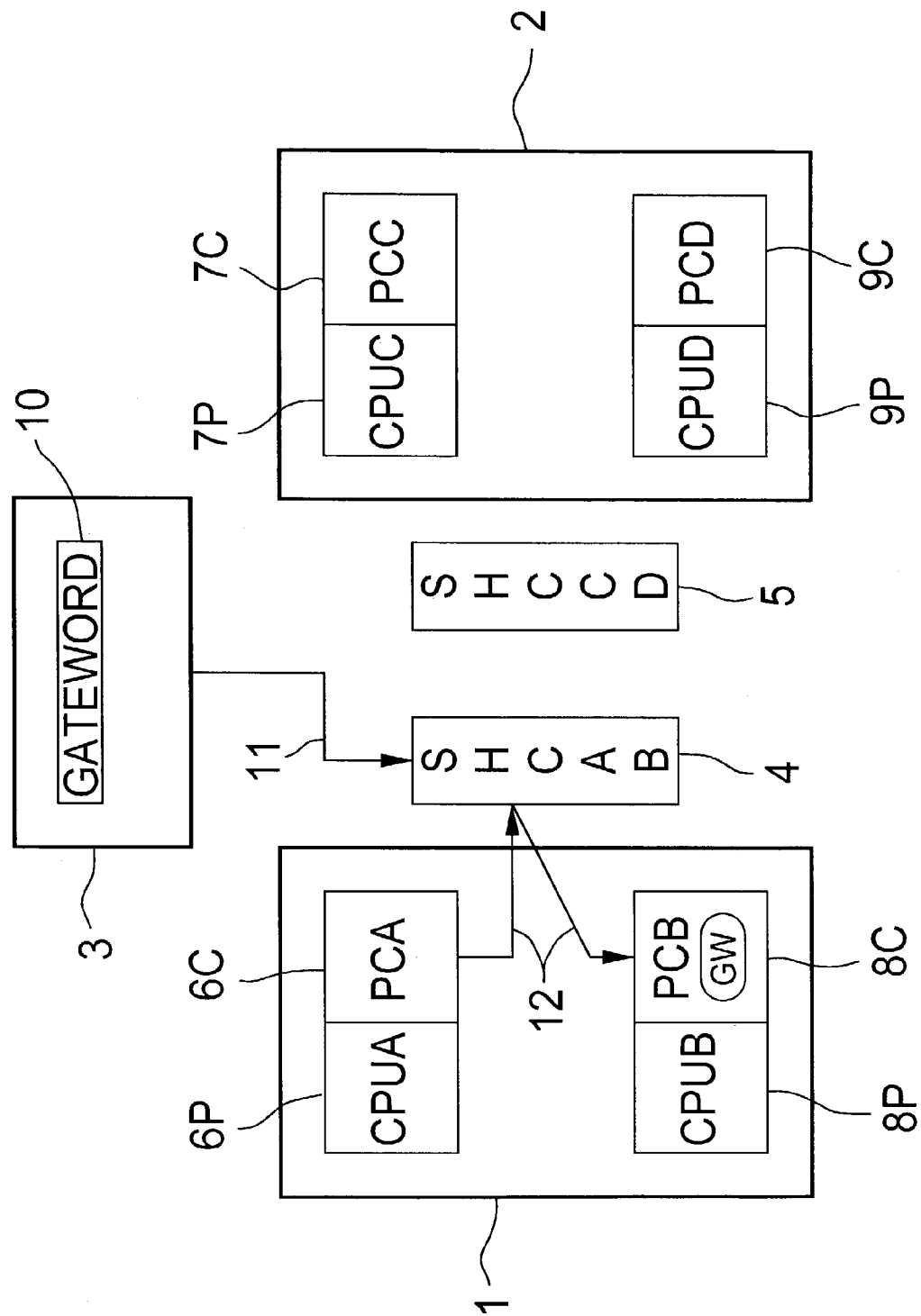
FIG. 3 is a block diagram of the exemplary multiprocessor system showing a second condition in which a second processor using the same shared cache as the first processor is seeking ownership of the gateword.
Figure 4:
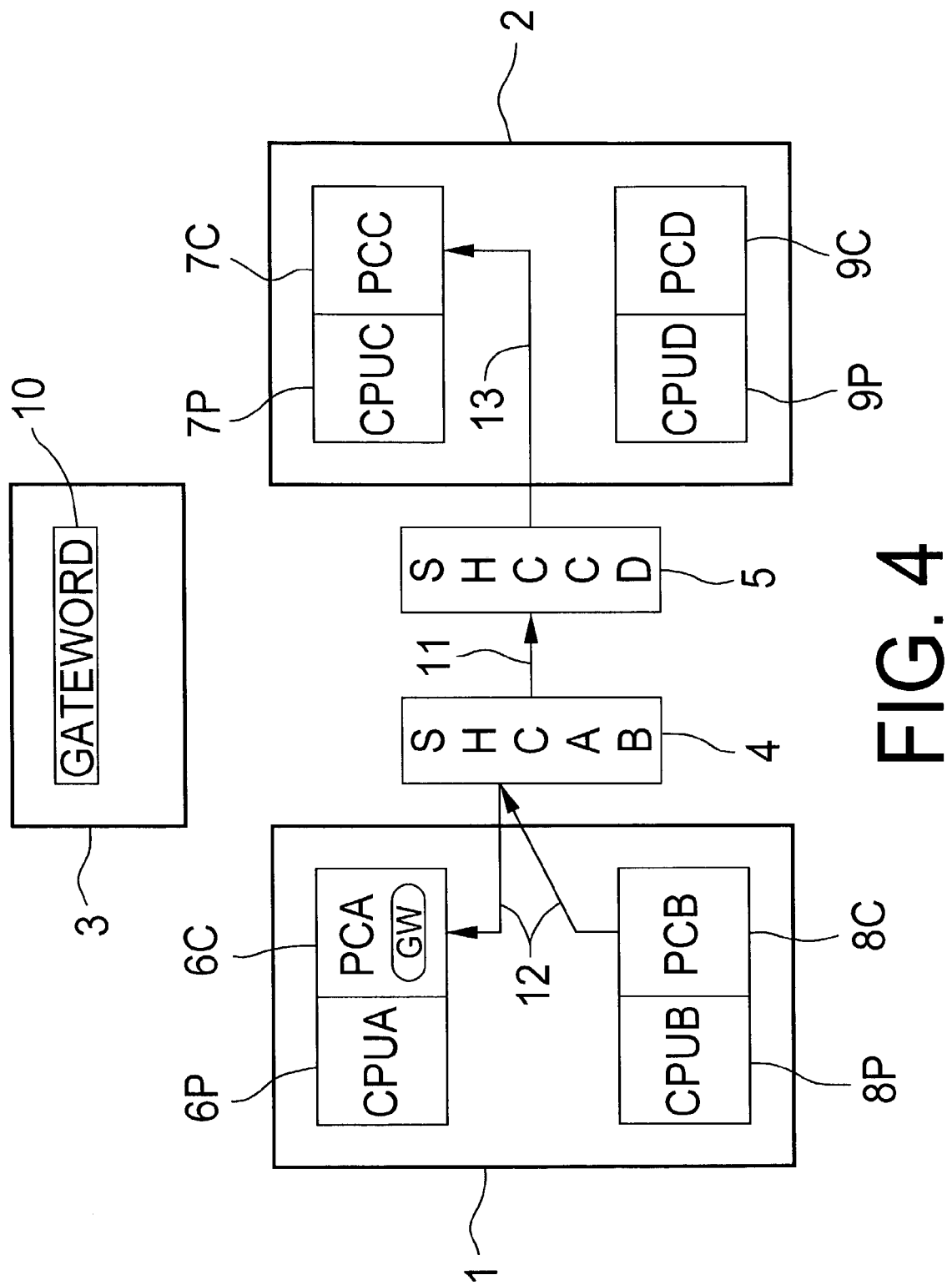
FIG. 4 is a block diagram of the exemplary multiprocessor system showing a third condition in which processors coupled to different shared caches are contending for ownership of the gateword.

Referring to FIGS. 2–4, the "hogging" problem is explained in detail. Two processor pairs 6P, 8P and 7P, 9P are respectively depicted on two circuit boards 1, 2 with first level private caches 6C, 8C, 7C, 9C. Second level shared caches (shared cache SHCAB 4 serving private caches PCA 6C, PCB 8C, and shared cache SHCCD 5 serving private caches PCC 7C, PCD 9C) are shown positioned between the boards 1, 2 to emphasize the delays inherent in a write-into-cache architecture. (In actual systems, a shared cache is typically disposed on the same board as the processor or processors it serves, and more than one processor may be disposed on the board and use the same shared cache. Further, in more dense circuit environments, several shared caches each serving one or more processors may be disposed on the same board.)

The term "write-into-cache" defines a caching process that saves time by avoiding the need to always send newly written data words to the main memory 3. In a write-into-cache environment, a newly written word is retained within the private cache of the processor that wrote it, and this is the only valid copy of the word in the memory hierarchy. All outdated copies in other processors are invalidated when the write occurs. A copy of the newly written word can be obtained by any processor using a siphon process. This will change the status of all copies of the newly written word from "valid, modified and owned by the processor" to "valid and modified" or "valid" depending on which board siphoned the word. "Modified" indicates that the main memory 3 does not currently have a valid copy. Main memory 3 will be routinely over-written with the modified copy, and thus updated, when the word needs to be displaced for new incoming data by a swapping operation.

Referring particularly to FIG. 2, a potential hogging conflict starts when a first processor CPUA establishes ownership of a gateword 10 it has obtained from main memory 3 via a system bus 11 and SHCAB 4 by doing a conventional read-alter-rewrite to acquire the gateword 10. The gateword cannot later be acquired from main memory 3 as long as there is ongoing competition for the process or data whose usage is controlled by the given gateword. (The gateword is usually found first in main memory 3 as depicted in a set of circumstances leading to hogging.) Processor CPUA 6P tests the gateword, now resident in its private cache PCA 6C, and, if allowed (not marked as already in use by another processor), will CLOSE the gateword and execute the gated common code or use the gated shared data which is guarded by the gateword.

Thus, in FIG. 2, processor CPUA has acquired ownership of the given gateword; it has the only valid copy of the gateword, in the entire memory hierarchy system, in its private cache PCA 6C. SHCAB also has a copy, but it is marked as owned by CPUA. CPUA proceeds to execute/use the protected code/data for which it has closed the gateword.

Referring now to FIG. 3, consider that if CPUB 8P wants to access the same code/data being executed/used by CPUA; it must first read and test the current version of the gateword.

To gain access for testing, it siphons (CPU "Siphon, same Shared Cache") the gateword from SHCAB 4 on the internal bus 12 of the board 1 and tests it. (The board 2 has a corresponding internal bus 13.) CPUB now has a read copy, and CPUA is no longer the owner. The status has been changed for the gateword in PCA, SHCAB and PCB to valid. But, CPUB cannot yet use the protected code/data, so it loops on testing the valid copy it retains in PCB. The status will not change until CPUA exits the protected code/data and writes the gateword OPEN to permit use of the guarded code or data by another processor. The status of the gateword will be changed to "valid, modified and owned", and CPUB can again gain access to the new version of the gateword by siphoning a copy from SHCAB into PCB via internal bus 12. This access path has very short delays because there is no need to pass information through the shared caches 4, 5 via the system bus 11.

In FIG. 4: a different condition is shown in which CPUA is still using the protected code/data, and CPUB is continuing to test the gateword in the version resident in PCA. Now, CPUC 7P on board 2 also needs to execute/use the routine/data guarded by this particular gateword. Its access path for obtaining a copy of the gateword for testing requires a significantly longer delay. It must siphon ("CPU 'Siphon', different Shared Cache") the data from PCA 6C through SHCAB 4, system bus 11 and SHACD 5 while competing with any other system bus activity, then through its own private cache PCC 7C for testing. After the first read, the gateword copy has been placed in CPUC/PCC and in SHCCD, and its status has been changed to "valid"; CPUC will loop while testing ifs own copy of the gateword. At this point, the gateword is still marked CLOSED because CPUA has not finished using the gated code/data. When CPUA finally finishes using the protected code/data, it will write the gateword OPEN. The gatewords status is changed to "valid, modified and owned" by CPUA.

At this point CPUA has the only updated copy of the gateword in PCA. Now the "hogging" begins. Both CPUB on board 1 and CPUC on board 2 undertake to acquire the gateword. However, CPUB can siphon the word from CPUA on the internal bus 12 of board 1 without using the system bus 11 while CPUC's attempted siphon must go onto the system bus 11 and through the shared cache interface mechanisms of both SHCCD and SHCAB. CPUB will always "win" under these conditions. It will test the gateword, find it OPEN and CLOSE it before CPUC can obtain a read copy of the gateword to test. Typically with heavily used gates, CPUA will again be trying to acquire the same gateword, this time in competition with CPUC, and it will win because of CPUC's handicap in the process. So it continues until CPUC is interrupted on its run timer and aborts the process that needs the gate. It "gives up" and will try again later.

It will be observed that a gateword protected code routine has some unique qualities. It is intended for use by one processor at a time; typically some time dependent data is being changed. The code of the gateword protected routine is short and interrupt protected with some fixed length of time that a processor can be executing in the protected code. The operating system uses gateword protected code extensively; and, as a result, multiple processors are always in contention for control of a given gateword. In the prior write-into-cache architectures, the gateword will be accessed repeatedly and passed from private cache to private cache with each access. Any delays in that access path imposed on a given processor versus another processor will cause an unacceptable priority where the processor with the fastest access path will hog gateword access and therefore control of the gated routine. Gateword protected data has similar characteristics.

The foregoing demonstrates the hogging problem. Now, it will be shown how an exemplary embodiment of the invention described and claimed in application Ser. No. 10/403,703 eliminates hogging.

All processors have a common access point to main memory 3, with equal priority levels, and this conventional arrangement offers the possibility to eliminate the hogging problem even though somewhat slower hardware access may result. This slower access can be measured against the much larger delays experienced in attempting to correct for hogging in any other known form of software and/or hardware mechanisms for that purpose (except, in some respects, for that of the earlier solutions discussed in the copending applications identified above which also are not practical for use in some operating system environments).

The embodiments of the invention described and claimed in application Ser. No. 10/403,703 take advantage of the recognition that gateword access by multiprocessors with unequal access delays in a "write-into-cache" architecture can be eliminated by forcing the gateword from a processor cache back out to main memory 3 whenever the gateword is written. This action must take place when a gateword is CLOSEd and, more importantly, when a gateword is written during the OPEN process.

To implement this feature, the functionality of gateword handling instructions (whatever they may be named in a given system) are changed from the prior art equivalents. These gateword handling instructions read a gateword, protect it from access during the read, then test it and re-write it. By adding a swap operation to the prior art gateword handling instructions and also instituting a brief delay in all processors attempting to access gatewords (to ensure that the gateword write to main memory will be safely completed), the effects of hogging are eliminated as will be shown with reference to FIGS. 5A, 5B, 5C and 6.

Figure 5A:
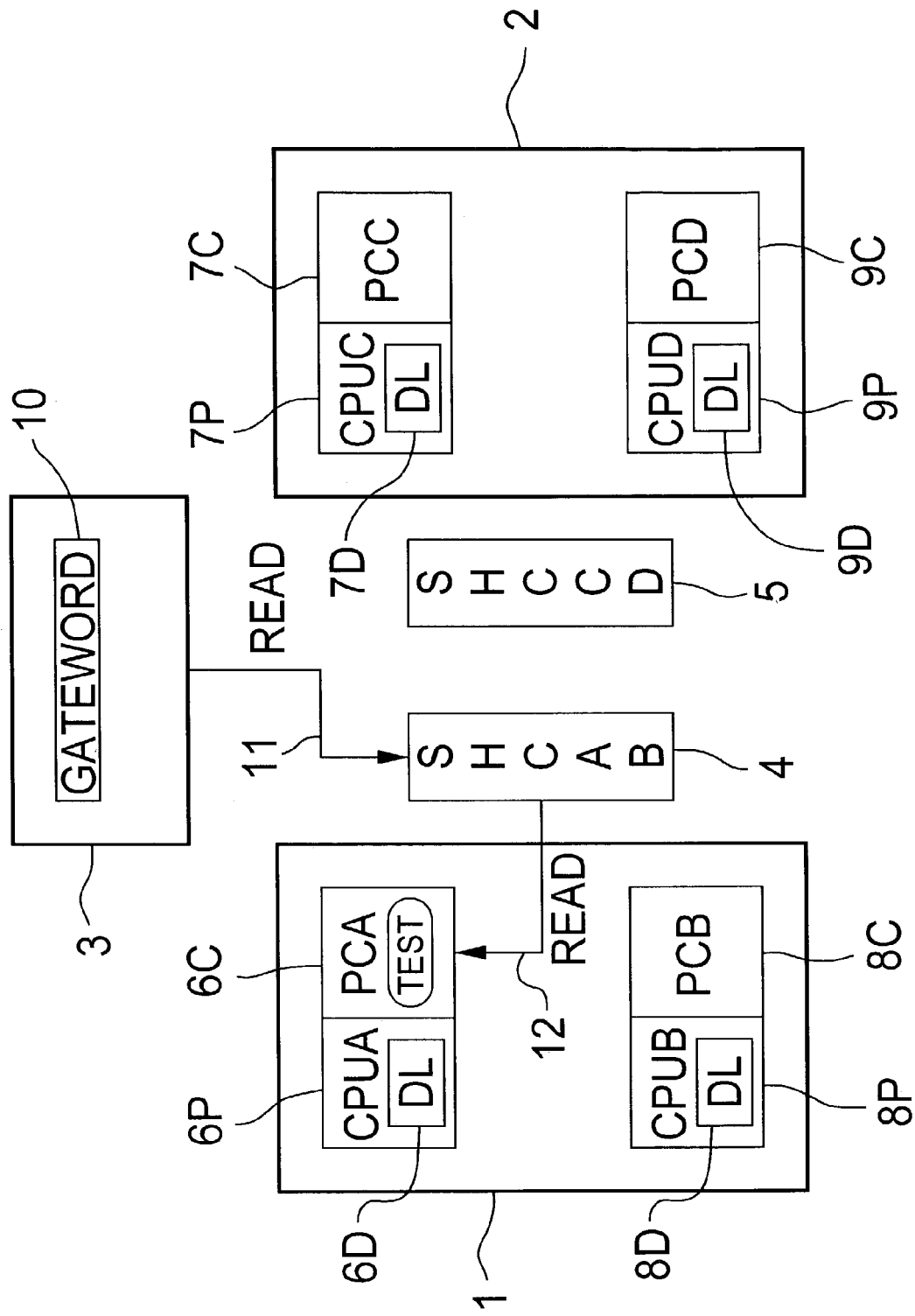
FIG. 5A is a block diagram of the exemplary multiprocessor system showing operations during performance of a first part of a gateword handling instruction.
Figure 5B:
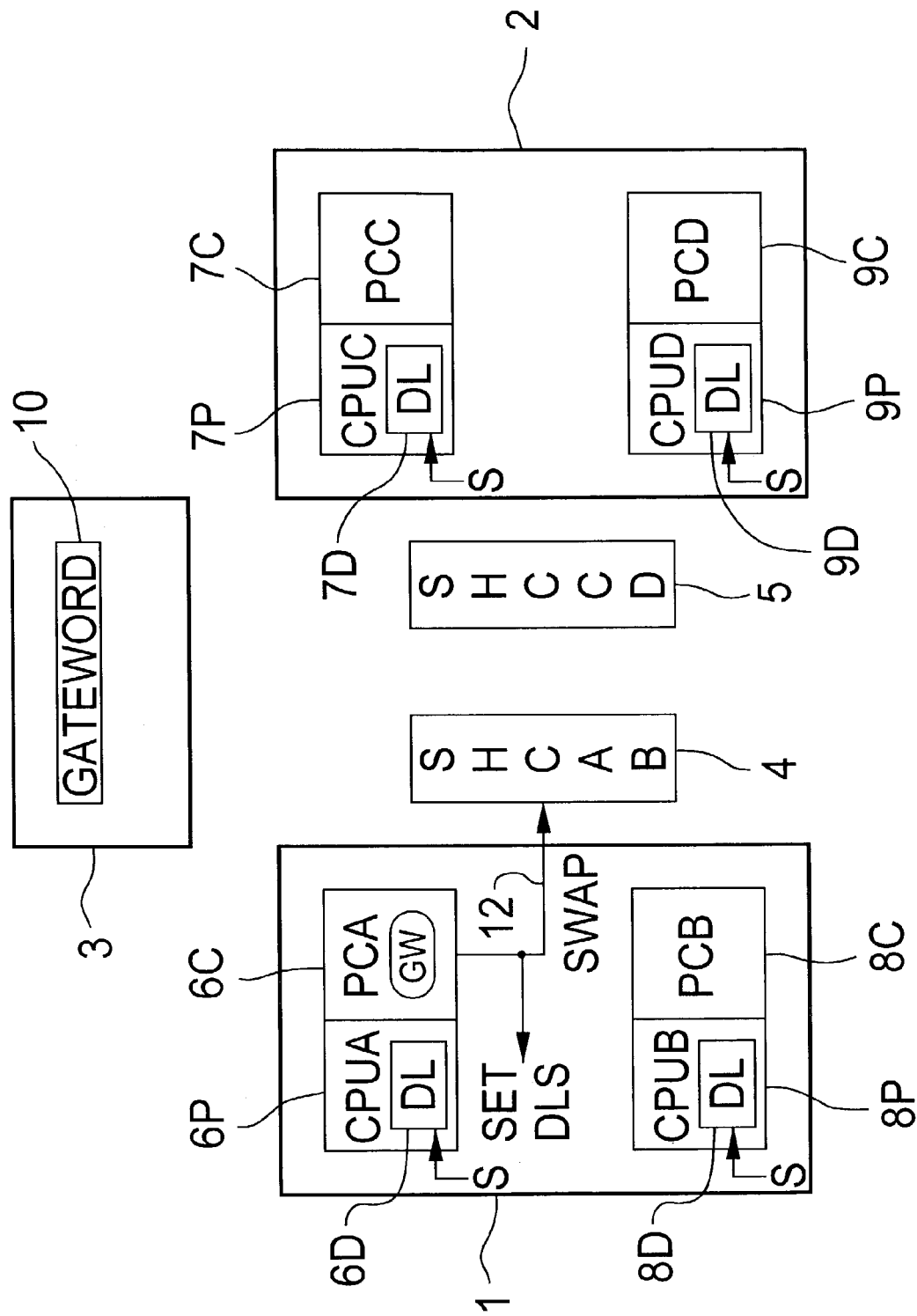
FIG. 5B is a view similar to FIG. 5A showing operations during performance of a second part of a gateword handling instruction.

Referring to FIG. 5A, a first stage of the execution of a READ gateword handling instruction in an exemplary embodiment of the invention disclosed and claimed in application Ser. No. 10/403,703 is illustrated. In a manner similar to that discussed above in conjunction with FIG. 2, the first processor CPUA 6P undertakes to establish ownership of a gateword 10 it has obtained from main memory 3 via the system bus 11, Shared Cache AB and local bus 12. CPUA tests the gateword, now resident in PCA 6C, and, if OPEN (not marked—written—as already in use by another processor), will CLOSE the gateword in PCA and begin to execute the gated common code or use the gated shared data which is guarded by the particular gateword. The second stage (CLOSE) of the execution (immediately following the first stage) of the READ gateword handling instruction in an exemplary embodiment of the invention is illustrated in FIG. 5B. CPUA, now having obtained ownership of the gateword and marked (written) it CLOSEd, institutes two operations. A "set delay flags" or "SYNC" special interrupt signal is sent to set the delay flags DL 6D, 7D, 8D, 9D in all processors in order to start brief delays in each processor before a gateword can be requested for testing by any processor from main memory 3. Then, a "CPU 'Swap' to Shared Cache" operation is performed (rather than a siphon operation according to the prior art). This places a valid copy of the gateword, with no CPU ownership indicated, in Shared Cache AB.

Figure 5C:
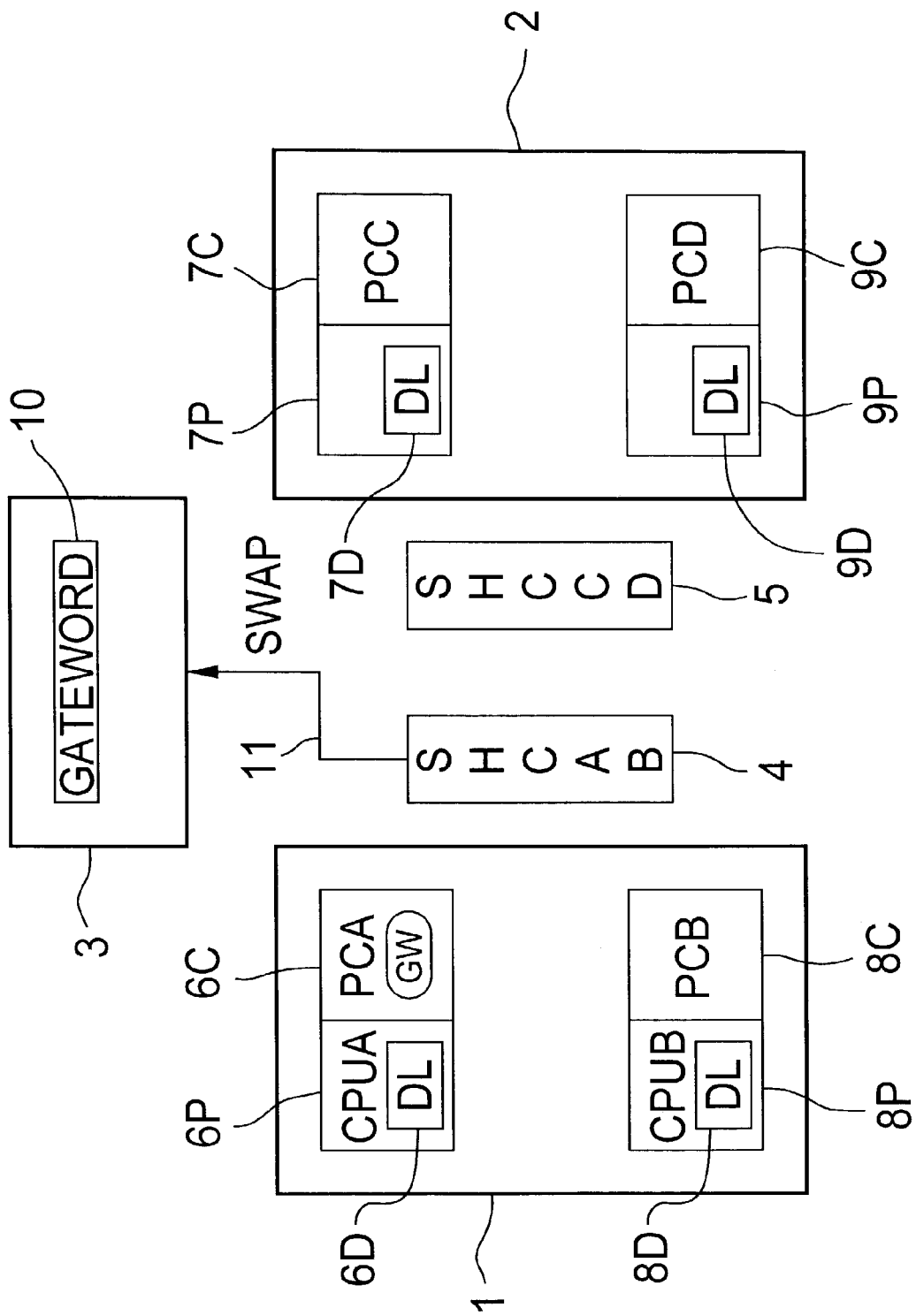
FIG. 5C is a view similar to FIGS. 5A and 5B showing operations during performance of a third part of a gateword handling instruction.

The immediately following third stage of the execution of a READ gateword handling instruction in an exemplary embodiment of the invention disclosed in claimed in application Ser. No. 10/403,703 is illustrated in FIG. 5C. A "Shared Cache 'Swap' to Main Memory" operation is performed to place a current version of the gateword, still marked CLOSEd, into main memory from Shared Cache AB. When the long delay flags time out, all processors in the system can read valid copies of the gateword from main memory 3, but upon testing, it will be found to be CLOSEd. The processors seeking ownership of the gateword will repeatedly read and test the gateword as individual processor operations permit.

When CPUA completes execution/use of the protected code/data, it will write the gateword OPEN in a manner similar to the steps shown in FIGS. 5B and 5C. A brief delay (which may be shorter than the previous delay) is instituted by setting the delay flags DL, and a "CPU 'Swap' to Shared Cache" operation is performed to place a valid copy of the gateword, marked "OPEN", in Shared Cache AB. Then, a "Shared Cache 'Swap' to Main Memory" operation is performed to move the valid gateword to main memory. As soon as the brief delays time out, the gateword again becomes equally available to all processors for reading and testing and potential acquisition by a processor.

Figure 6:
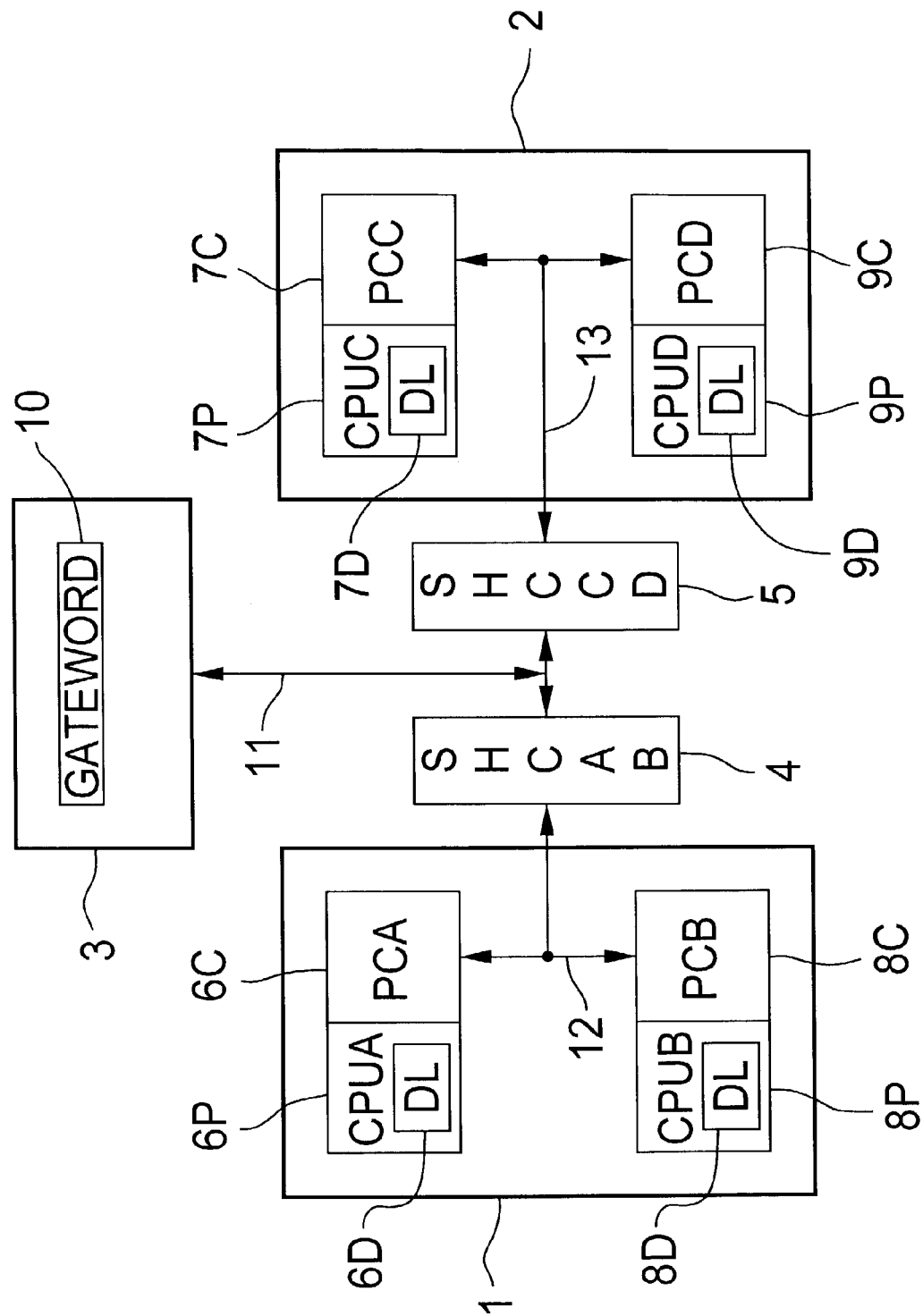
FIG. 6 is a view similar to FIGS. 5A, 5B and 5C showing operations during performance of a third part of a gateword handling instruction.

Thus, as shown in FIG. 6, all processors have equal access to the gateword stored in main memory for reading and testing because the delays encountered during such reads are the same as to all processors. Accordingly, hogging conditions never arise; and the first processor to find the gateword OPEN in main memory 3 will acquire ownership and proceed as described above.

But, using the Gate Test (SZNC) and Gate Control (STC2) instructions to force delays that prevent software gateword contention can itself degrade gateword access performance. This can happen if delays are imposed when there is no contention for a gateword access. To help illustrate this phenomenon, it is useful to review the operation of the Test (SZNC) and Gate (STC2) instructions.

When several processors try to access the same software gateword at the same time, one will get control and close the gate. All the remaining processors will then wait behind the closed gate. This typically means, they will loop on the Gate Test (SZNC) instruction and finding the gate CLOSEd by testing content, will with a conditional instruction, transfer or loop back to the Gate Test (SZNC) instruction. Each processor executing a gate wait loop will have a read copy of the gateword in their cache. After the original processor writes the gateword with the closed data, its cache will have the only valid copy of the gateword. The next processor in contention for this same gateword, which attempts access, will get a read copy of the word. Ownership will not remain with the processor that originally closed the gate with a write operation. Each processor in contention for the same gate (in a gate wait loop) will have a read only copy in its cache until the original processor writes the gateword with the open pattern.

When the processor, that closed the gateword, opens it with a Gate Control (STC2) instruction, the sequence of events is as follows:

1) The Gate Control (STC2) instruction will send a special interrupt (SYNC) to all processors in the system to set a flag DL that will impose a fixed delay the next time the Gate Test (SZNC) instruction is executed. This is the long delay.
2) After issuing the interrupt, the Gate Control (STC2) instruction delays (short delay) long enough for all processors in the system to have received the interrupt.
3) All processors will receive the interrupt. The next time a processor executes a Gate Test (SZNC) instruction, it first checks for the special interrupt and if set will execute a long delay before continuing with the normal Gate Test (SZNC) instruction execution. This long delay prevents the processors in contention from accessing their caches for the duration of the long delay. This allows time for the gateword to be flushed from all caches and put back in memory.
4) After the short delay, the Gate Control (STC2) instruction updates the gateword with a write-with-OPEN data as it would normally do. The processor opening the gateword with a write now has the only valid copy in its private cache. This has the effect of invalidating the read-only copies of the gateword in all other processors in the system.
5) The Gate Control (STC2) instruction sends a second special interrupt to its shared cache. This causes a flush of the gateword, forcing it back to memory. This is done with a siphon and clears for the block of memory containing the gateword. This forces the block back to memory.

This series of steps OPENs the gateword with a write and moves it to main memory where all shared caches have an equal chance to gain access to the gateword in contention. This is achieved by establishing equal delays in the hardware structures used in accessing memory.

The invention disclosed and claimed in application Ser. No. 10/403,703 prevents or at least mitigates hogging for access to a single gate in contention, but multiple processes running in a multiprocessor system will typically require a number of gatewords, each guarding access to individual code/data sets. Thus, if a given processor wants access to a gateword that is not in contention with any other process, this processors gate access will be forced to a full long delay in accordance with the invention disclosed and claimed in application Ser. No. 10/403,703, even though it does not want to compete for the same gateword.

Figure 7:
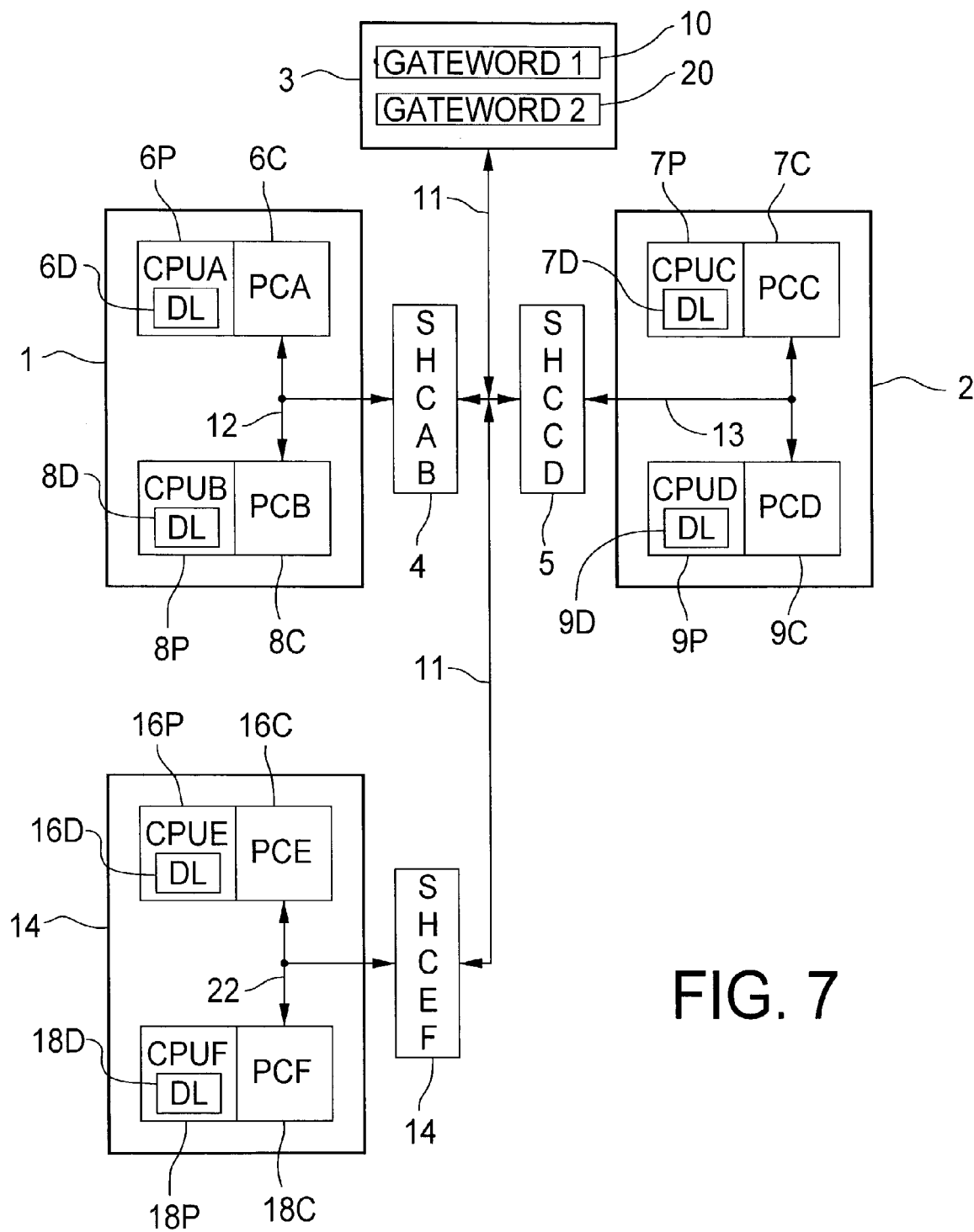
FIG. 7 is a view similar to FIG. 6 showing operations when more than one processor is contending for a first gateword and at least one other processor is contending for a second gateword.

For example, as shown in FIG. 7, gateword 110 and gateword 220 (there can be as many gatewords as may be suitable to a given system) are stored in main memory 3. If, as previously described by way of example, CPUA 6P has successfully gained access to gateword 1, it sends the special interrupt (SYNC) to all other processors in the system, including CPUE 16P. However, CPUE is not competing for gateword 1, but is competing for gateword 220. In accordance with the embodiments of the invention disclosed in application Ser. No. 10/403,703, CPUE will undergo the long delay just as if it were in contention for gateword 1. This fact imposes limitations on system performance in systems employing multiple gatewords. Embodiments of the present invention significantly mitigate this problem as will become clear from the discussion below with reference to FIGS. 8 and 9.

Figure 8:
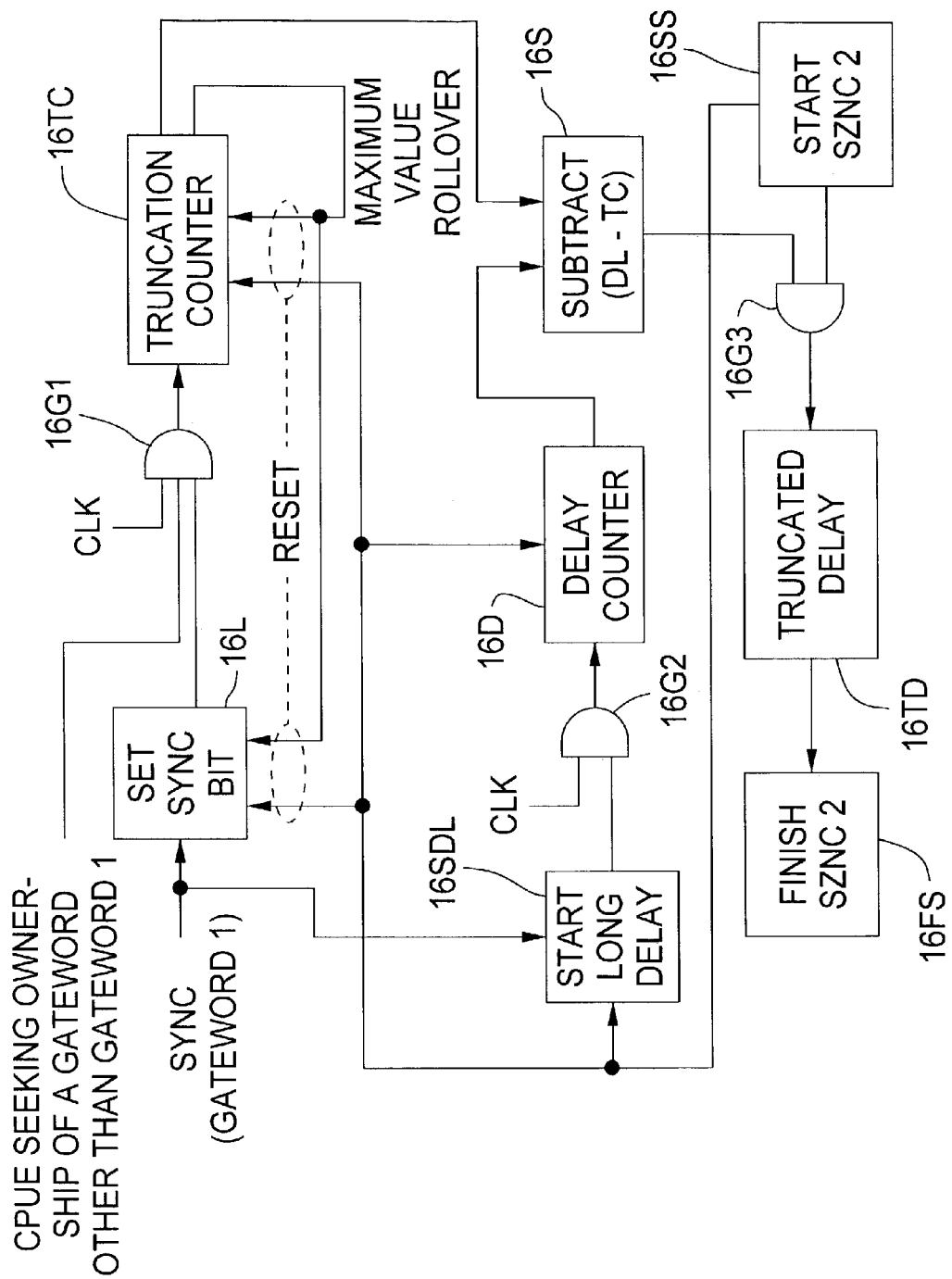
FIG. 8 is a high level block diagram of first counter logic and control circuitry/firmware incorporated into each processor in accordance with a first exemplary embodiment of the invention.

Attention is now directed to FIG. 8, which is a high level block diagram of simplified exemplary counter logic (hardware or hardware/firmware) included in each processor in the system; the particular processor being discussed in the example is CPUE 16P (FIG. 7). A latch 16SDL is set by a SYNC (special interrupt) signal broadcast by a processor, e.g. CPUA 6P (FIG. 7) which has obtained ownership of gateword 1 while executing SZNC 1 as previously described. This action starts, via AND-gate logic 16G2, CPUE's delay counter 16D which is incremented (in this example) by the system clock CLK to begin the long delay as also previously described.

In addition, the SYNC signal from the processor which has acquired gateword 1 also sets another latch 16L to enable one input to AND-gate logic 16G1. The system clock CLK is applied to another input to AND-gate logic 16G1 and a signal indicating that CPUE is (or intends to) seek ownership of a gateword other than gateword 1, gateword 2 in the example, is applied to yet another input to AND-gate logic 16G1. Accordingly, if AND-gate logic 16G1 is fully enabled, the CLK begins to increment a previously reset truncation counter 16TC. (Note carefully that the "CPUE SEEKING OWNERSHIP OF A GATEWORD OTHER THAN GATEWORD 1" signal may be issued at any time between the reception of the "SYNC (GATEWORD 1)" signal and the time out of the delay counter 16D.)

Assuming that the "CPUE SEEKING OWNERSHIP OF A GATEWORD OTHER THAN GATEWORD 1" issues at some intermediate time, the truncation counter 16TC and the delay counter 16D will be counting in synchronism, but the truncation counter will typically hold a lower count because it started later. The instantaneous count in the truncation counter 16TC is continuously subtracted from the instantaneous count in the delay counter 16D by subtraction logic 16S such that the output of the subtraction logic, the instantaneous difference, is applied to one input set of AND-gate logic array 16G3 which is fully enabled whenever CPUE starts the process to interrogate gateword 2 by starting an SZNC 2 operation 16SS. When the SZNC 2 is started, a truncated delay 16TD (DL-TC) is invoked, and this truncated delay allows CPUE to test gateword 2 no later than the same time that gateword 1 is OPENed rather than waiting the full long delay. The average truncated delay is about half the full long delay. The SZNC 2 operation also resets the latches 16L, 16SDL and counters 16TC, 16D. It may also be noted that the truncation counter 16TC rolls over at a predetermined maximum count to reset itself and the latch 16L because the SCNZ 2 16SS may not be invoked during the relevant time periods.

Figure 9:
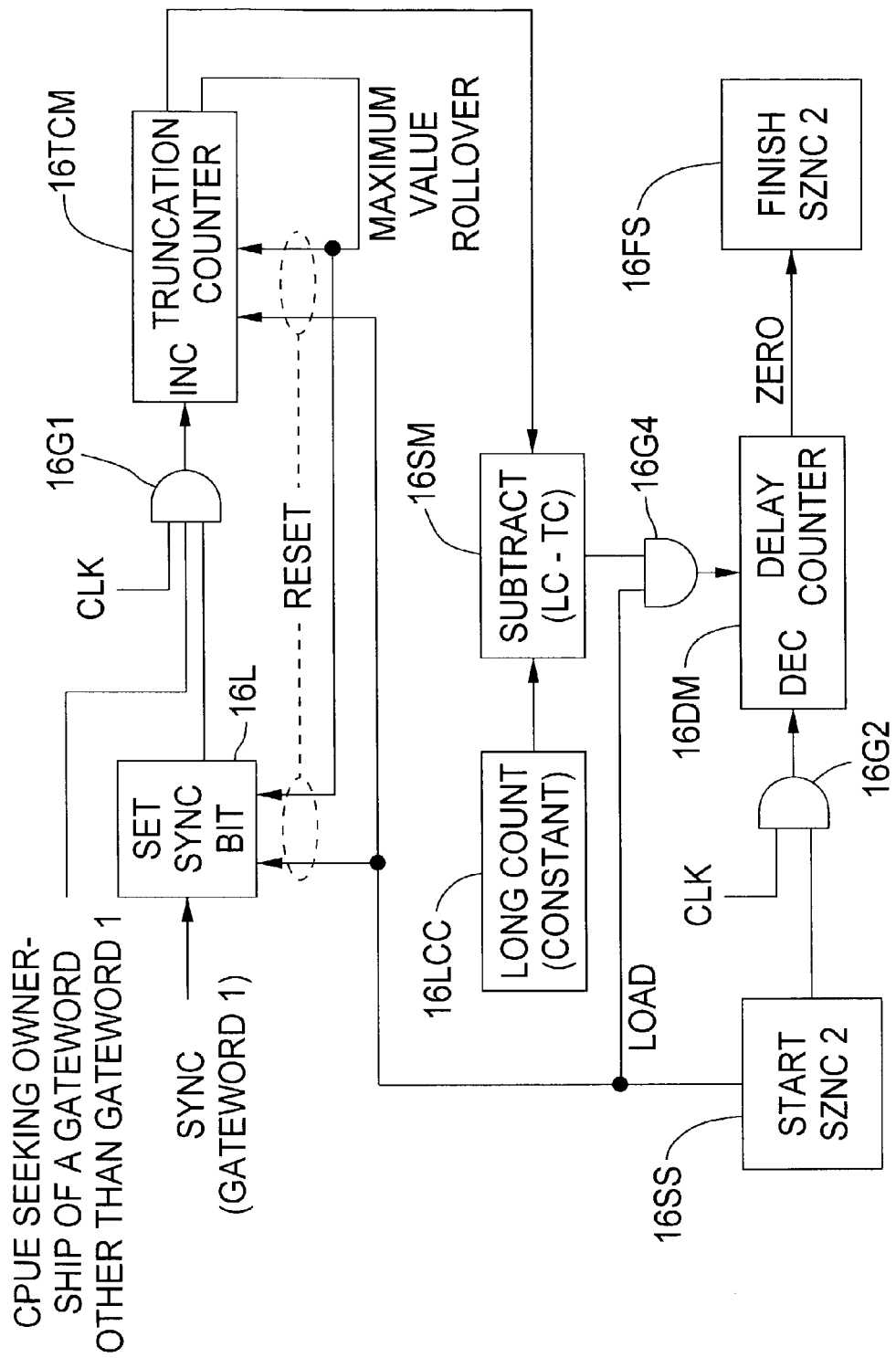
FIG. 9 is a high level block diagram of second counter logic and control circuitry/firmware incorporated into each processor in accordance with a second exemplary embodiment of the invention.

A second exemplary embodiment of the counter logic is shown in FIG. 9. This embodiment is more simple logically than the embodiment shown in FIG. 8, more easily implemented in hardware/firmware and is a direct functional replacement. Again, the particular processor being discussed in the example is CPUE 16P (FIG. 7), and the latch 16L is set by a SYNC (special interrupt) signal broadcast by a processor, e.g. CPUA 6P (FIG. 7) which has obtained ownership of gateword 1 while executing SZNC 1 as previously described. This action enables one input to AND-gate logic 16G1. The system clock CLK is applied to another input to AND-gate logic 16G1 and a signal indicating that CPUE is (or intends to) seek ownership of a gateword other than gateword 1, gateword 2 in the example, is applied to yet another input to AND-gate logic 16G1, all as described in conjunction with the logic shown in FIG. 8. When AND-gate logic 16G1 is fully enabled, the CLK begins to increment a previously reset modified truncation counter 16TCM.

The modified delay counter 16DM of the FIG. 9 embodiment differs from the delay counter 16D of the FIG. 8 embodiment in two respects: 1) the output of AND-gate logic 16G2 drives a decrement input to delay counter 16DM such that it counts down at each CLK pulse when AND-gate logic 16G2 is fully enabled; and 2) it is selectively loaded with a variable count from modified subtraction logic 16SM which issues an ongoing representation of the difference between a stored long count constant 16LCC and the instantaneous count in the truncation counter 16TCM (LC-TC).

The delay counter 16 DM is loaded with (LC-TC) upon the start of SZNC 2 16SS. Thereafter, it counts down from the value entered until is reaches zero to issue corresponding signal which permits SZNC 2 to finish. Accordingly, When the SZNC 2 is started, a truncated long delay (LC-TC) is invoked, and this truncated delay allows CPUE to test gateword 2 no later than the same time that gateword 1 is OPENed rather than waiting the full long delay.

Thus, the logic of FIG. 9 is the direct functional equivalent of the logic of FIG. 8 such that the average truncated delay is about half the full long delay. The START SZNC 2 16SS operation also resets the latch 16L and the truncation counter 16TCM to anticipate a succeeding use.

Figure 10:
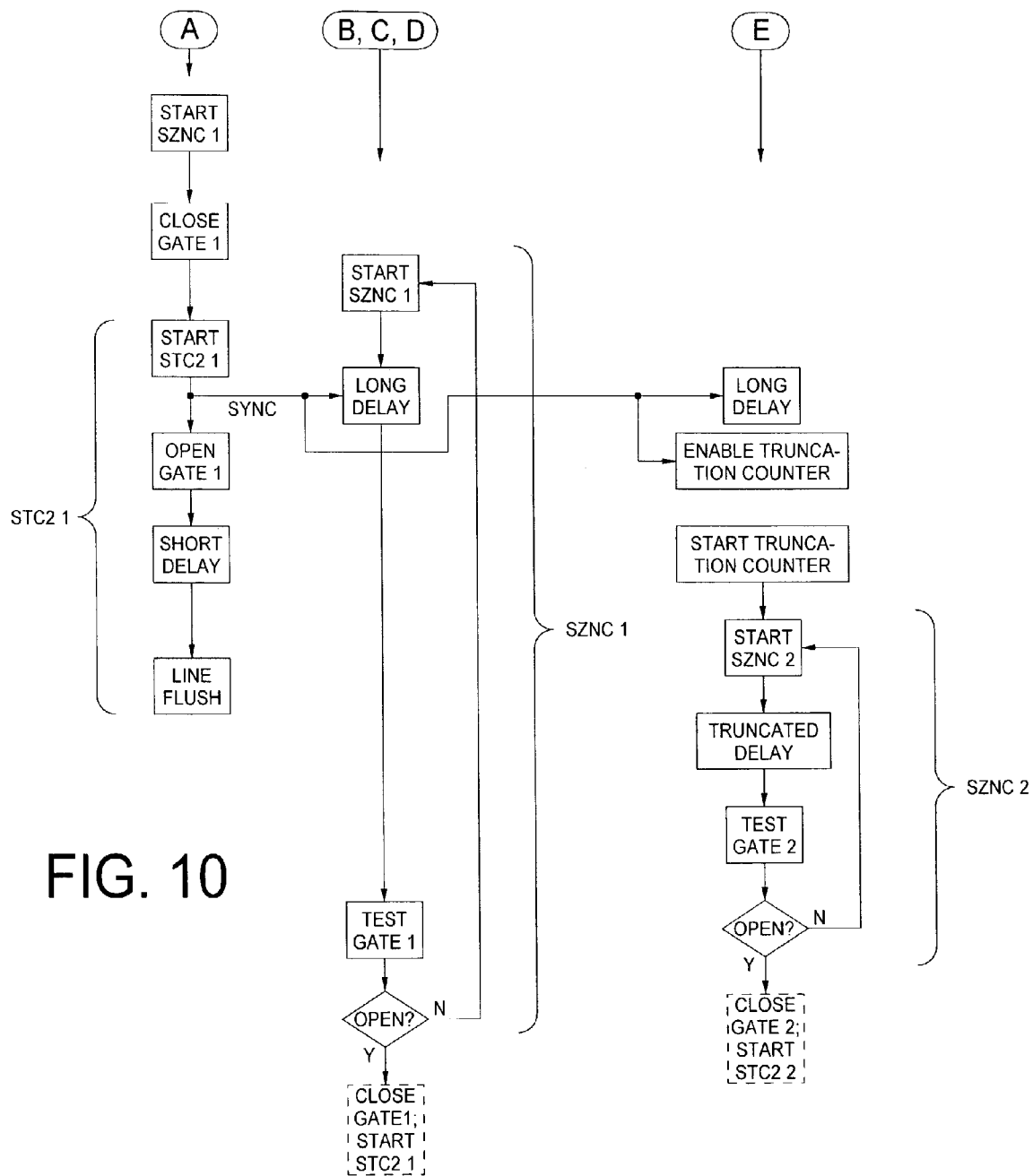
FIG. 10 is a combined timing diagram/high level flow chart of operations taking place in the block diagram of FIG. 7 when more than one processor is contending for a first gateword and at least one other processor is contending for a second gateword.

The advantages enjoyed by these exemplary embodiments of the invention (or other functionally equivalent embodiments) can be more fully appreciated with reference to the timing chart shown in FIG. 10. Assume that CPUA has tested gateword 1, found it OPEN and therefore taken ownership, all via execution of an SZNC 1 (gate test for gateword 1). It first CLOSEs gateword 1 and then invokes the gate control instruction STC2 1 for using gated code/data guarded by gateword 1. CPUA then sends the special interrupt/sync signal to all processors in the system. If, any one or more of CPUB, CPUB, CPUC starts execution of an SZNC 1 (gate test for gateword 1) after CPUA has CLOSEd gateword 1, then the one or more processors will each start a long delay, for the purposes previously described, before gateword can be tested.

However, CPUE, which is seeking ownership of gateword 2 by executing an SZNC 2 instruction, will only be subject to the truncated delay as described above in conjunction with FIGS. 8 and 9. Thus, it will be seen in FIG. 10 that CPUE can test gateword 2 no later than when the earliest among CPUB, CPUC, CPUD can test gateword 1 and typically substantially sooner. Accordingly, CPUE (or any other processor contending for gateword 2) will not be penalized by the actions of CPUA in starting the long delays in all processors in the system.

Of course, the embodiments of the invention are not limited to handling only two gatewords. Any suitable number of gatewords may be employed in a given system such that the time at which any processor can test any gatewords other than gateword 1 (in the example) will be advantageously subject to truncated delays, rather than long delays, notwithstanding the issuance of the SYNC signal sent to all processors by CPUA (in the example).

The structure of the embodiments of the invention shown in FIGS. 8 and 9 were chosen for clarity in describing the invention. Those skilled in the art will appreciate that the invention can readily be implemented in various embodiments appropriate to the actual logical structure of given processor designs. Merely by way of example, the counters 16D, 16TC (FIG. 8) can be preset and then decremented (negative incrementation) to a predetermined count, typically zero. In another variant, the truncation counter can be eliminated and the delay counter incremented/decremented from sources equivalent to the outputs from AND-gate logic 16G1 and AND-gate logic 16G2, driven by alternate half system clocks which are typically available in modern processors. In short, the basic concepts of the invention can be implemented in many ways suitable for use in given system architectures and processor logic.

While the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. A multiprocessor write-into-cache data processing system comprising:
   A) a memory;
   B) at least first and second shared caches;
   C) a system bus coupling said memory and said first and second shared caches;
   D) at least first, second, third and fourth processors having, respectively first, second, third and fourth private caches, each of said first, second, third and fourth processors incorporating respective first and second delay means;
   E) said first and second private caches being coupled to said first shared cache by a first internal bus, and said third and fourth private caches being coupled to said second shared cache by a second internal bus;
   F) a plurality of gatewords stored in said memory, each said gateword governing access to different common code/data sets, each common code/data set being shared by processes running in a plurality of said processors;
   G) first means for each given processor to read and test each of said gatewords by performing successive swap operations between said memory and said given processor's shared cache and between said given processor's shared cache and private cache;
   H) second means for a first given processor finding a first tested gateword stored in memory OPEN to write said first tested gateword CLOSEd in its private cache, and, thereafter, successive swap operations are carried out between:
      1) the first given processor's private cache and the first given processor's shared cache; and
      2) the first given processor's shared cache and memory to flush the first given processors shared cache of a block containing said first tested gateword and thereby write said first tested gateword CLOSEd in memory;
   I) third means by which said first given processor starts said first delay means in all processors to institute first delays to temporarily prevent any processor from reading and testing said first gateword;
   J) fourth means, when said first given processor completes use of the common code/data governed by said first tested gateword, writing said first gateword OPEN in its private cache, and, thereafter, successive swap operations are carried out between:
      1) the first given processors private cache and the first given processor's shared cache; and
      2) the first given processor's shared cache and memory to flush the first given processors shared cache of the block containing the first tested gateword and thereby write said first tested gateword OPEN in memory;
   K) fifth means for starting said second delay means in any processor which is seeking ownership of a gateword other than said first tested gateword; and
   L) sixth means for truncating said delay started by said third means in all said processors which are seeking ownership of a gateword other than said first tested gateword by subtracting the elapsed delay indicated in said second delay means from the elapsed delay indicated in said first delay means.

2. In a multiprocessor write-into-cache data processing system including: a memory; at least first and second shared caches; a system bus coupling the memory and the first and second shared caches; at least first, second, third and fourth processors having, respectively first, second, third and fourth private caches with the first and second private caches being coupled to the first shared cache, and the third and fourth private caches being coupled to the second shared cache; a method for preventing hogging of ownership of a first gateword stored in the memory which governs access to a first common code/data set shared by processes running in a plurality of the processors while, at the same time, mitigating any adverse effect on performance of processors attempting to access a gateword other than the first gateword; the method comprising:
   A) when a given processor seeks access to the first common code/data set, reading the first gateword into the given processor's private cache by performing successive swap operations between:
      1) the memory and the given processor's shared cache; and
      2) the given processor's shared cache and the given processor's private cache;
   B) testing the first gateword in the given processor's private cache for an OPEN condition;
   C) if the first gateword in the given processor's private cache is found to be OPEN, writing the gateword CLOSEd therein and thereafter carrying out successive swap operations between:
      1) the first given processor's private cache and the first given processor's shared cache; and
      2) the first given processor's shared cache and memory to flush the first given processor's shared cache of a block containing the first gateword and thereby write the first gateword CLOSEd in memory;
   D) starting a first delay in all processors to temporarily prevent any processor from reading and testing the first gateword;
   E) when the first given processor completes use of the common code/data set governed by the first gateword, writing the first gateword OPEN in its private cache, and thereafter carrying out successive swap operations between:
      1) the first given processor's private cache and the first given processor's shared cache; and
      2) the first given processor's shared cache and memory to flush the first given processor's shared cache of the block containing the first gateword and thereby write the first gateword OPEN in memory;
   F) starting a second delay in any processor which is seeking ownership of a gateword other than the first gateword; and
   G) truncating the delay started in step D) in all processors which are seeking ownership of a gateword other than the first gateword by subtracting the elapsed time indicated by the second delay from the elapsed time indicated by the first delay.

3. In a multiprocessor write-into-cache data processing system including: a memory; at least first and second shared caches; a system bus coupling the memory and the first and second shared caches; at least one processor having a private cache coupled, respectively, to each of the first shared cache and the second shared cache; a method for preventing hogging of ownership of a first gateword stored in the memory which governs access to a first common code/data set shared by processes running in the processors while, at the same time, mitigating any adverse effect on performance of processors attempting to access a gateword other than the first gateword; the method comprising:

A) when a given processor seeks access to the first common code/data set, reading the first gateword into the given processor's private cache by performing successive swap operations between:
   1) the memory and the given processor's shared cache; and
   2) the given processor's shared cache and the given processor's private cache;
B) testing the gateword in the given processor's private cache for an OPEN condition;
C) if the first gateword in the given processor's private cache is found to be OPEN, writing the first gateword CLOSEd therein and thereafter carrying out successive swap operations between:
   1) the given processor's private cache and the given processor's shared cache; and
   2) the given processor's shared cache and memory to flush the given processor's shared cache of a block containing the gateword and thereby write the gateword CLOSEd in memory; and
D) starting a first delay in all processors to temporarily prevent any processor from reading and testing the first gateword;
E) when the given processor completes use of the common code/data set governed by the first gateword, writing the first gateword OPEN in its private cache, and thereafter carrying out successive swap operations between:
   1) the given processor's private cache and the given processor's shared cache; and
   2) the given processor's shared cache and memory to flush the first given processor's shared cache of the block containing the gateword and thereby write the first gateword OPEN in memory;
F) starting a second delay in any processor which is seeking ownership of a gateword other than the first gateword; and
G) truncating the delay started in step D) in all processors which are seeking ownership of a gateword other than the first gateword by subtracting the elapsed time indicated by the second delay from the elapsed time indicated by the first delay.

* * * * *